Patented May 30, 1933

1,911,869

UNITED STATES PATENT OFFICE

JOSEPH A. ZALOOM, OF BROOKLYN, NEW YORK, ASSIGNOR TO ZENOBIA CO. INC., OF NEW YORK, N. Y., A CORPORATION OF NEW YORK

PROCESS FOR TREATING NUTS

No Drawing.    Application filed February 4, 1933. Serial No. 655,262.

My present invention is concerned more particularly with nuts, such as pistachio nuts, the kernels of which are enclosed in cleft hard shells. The invention is concerned with the process of treating such nuts to render them highly attractive in appearance, improved in flavor and crispness and in the permanence thereof even under vigorous vibration in transportation and under conditions of humidity and heat during storage.

As conducive to a clear understanding of the invention, it is noted that while pistachio nuts (with which the invention is particularly concerned) when coated white in accordance with the teachings of Reissue Patent No. 15,902 to Salim F. Zaloom have met with wide public favor by reason of their freedom from grubbiness and worminess and their generally attractive appearance, there has been considerable demand more recently for such nuts, the shells of which are artificially colored, usually red, instead of being whitened according to the specific teachings of the prior patent.

The nuts, when colored in the manner heretofore practiced, as compared with those treated according to the teachings of the patent, have a number of serious disadvantages. They are subject to worminess and grubbiness, have a tendency to lose their flavor, and in fact, have no real advantage over nuts roasted and salted according to the "home style" process practiced from time immemorial in the Orient, where the pistachio nuts are grown. To be sure, the nuts, when colored, are more attractive to the eye than the dirty grey product of the "home style" process, but even this advantage is accompanied by the disadvantage that the dye on the nuts stains the fingers and lips of the person handling and cracking the nuts preparatory to eating.

Among the objects of the present invention are to impart to the pistachio nut any desired color to meet the demands of the public fancy, which shall be harmless to the nut and which shall not come off on the skin of the consumer.

Another object is to provide a process of the above character, which shall render the nut substantially proof against becoming soggy, grubby or wormy, and by which the flavor of the kernel shall be preserved to a degree comparable with the advantages of the prior patented process.

Another object is to provide a process of the above character which admits of the use of dry crystalline salt for flavoring the kernel and reliably seals such salt into the nut within its shell without danger of loss under vibration, invariably incurred in use.

Another object is to accomplish the results stated, by the use of simple equipment and inexpensive materials and in a thoroughly practical and expeditious manner.

According to the invention, the nuts as they come from the Orient, with the kernel slightly exposed through the cleft between the two segments of the hard, dirty-gray shell, are first placed into a conventional roasting oven of the type used for roasting coffee, where they are tumbled and heated preferably for about 10 minutes at about 200 degrees F. As a result of this preliminary heating, the color to be next applied will form more evenly on the shell. Thereupon, there is applied to the nuts, while the tumbling and heating operation is continued, a masking coating concealing the natural color of the shell, preferably a coating of color. The color coating is applied as a spray during continued heating and tumbling of the nuts, the solution being preferably preheated to about 150 degrees F. The spray may be applied for a period of about 10 minutes, and as the water is evaporated from the solution during the continued roasting, the coloring matter adheres to the hard shell of the nut and to the exposed part of the kernel. Ordinarily three ounces of certified red food color to eight gallons of water forms a desirable coloring mixture, but the proportions may be varied greatly and any desired color may be used.

The nut is now preferably seasoned, ordinarily with salt. The seasoning operation is preferably conducted in a roaster similar to that used during the first steps of the process, except that the drum of this roaster is imperforate, and has a mass of dry crystalline salt therein, usually about 100 pounds of salt for 350 pounds of nuts. In this drum, the nuts are treated and tumbled under heat, preferably roasting heat (about 350 degrees F.) for about 20 minutes. The result of this last treatment in addition to roasting the nut, is to cause dry crystals to stick especially within the cleft of the shell, and on the soft meat of the exposed kernel. By reason of the smooth surface of the shell, however, and the tumbling operation, little or no salt remains on the shell.

After the colored nuts have been removed from the roaster and allowed to cool, they are now given a protective transparent glazed coating. This coating should be substantially insoluble in water, harmless to the digestive system and bacteria excluding. The substance preferred for this purpose is a pure and edible form of shellac devoid of arsenic and rosin. This substance preferably in alcoholic solution, is sprayed through a blower upon the nuts, placed in an appropriate revolving machine. One pound of the edible shellac thoroughly mixed in one quart of alcohol affords a satisfactory spray. After spraying, the nuts are promptly removed from the machine and spread out, a fan blower being preferably used to expedite evaporation of the alcohol solvent.

While reasonably satisfactory results may be obtained by applying the glaze coating as set forth, it is preferred, first, to apply a foundation coating therefor, which aids in effecting a more secure adhesion over the color coat on the shell of the nut. Such foundation coating may be a solution of gum, preferably gum arabic, ordinarily two pounds, dissolved in a gallon of water. This gum solution may be applied by the aid of a blower to the previously colored nut and the air blowing continued after application of the spray and without applied heat until the gum is dry. Thereafter, the edible shellac coating would be applied, as above set forth. The gum solution may also have additional coloring therein to intensify the effect produced by the previous color coating. In use of this alternative, one half ounce of the certified food color, to one gallon of the gum solution, has been found effective for the purpose. If desired, the application of color and gum may be effected in a single step but the specific arrangement previously described is preferred.

As a result of the above process, there is produced a nut of highly attractive appearance. The shell has not the dull color of the dye used, but a lustrous finish or lacquer-like closely adhering skin imparted by the outer coating or coatings.

The outer coating which covers not only the shell but the exposed surface of the kernel as well, is impervious to water and to bacteria and thus effects a seal to preserve the kernel, and to prevent it from becoming soggy under ordinary atmospheric conditions to which it may be exposed while on the shelves in the store prior to retail sale.

The impervious closely adherent transparent coating covering that limited area of the kernel which is exposed as above noted, serves as a seal to keep the flavoring salt within the nut in its shell, even under the violent vibration incurred during transit of the nuts in their containers.

Of course, the color coat could be omitted and the transparent coat applied direct to the uncolored nut, to impart to it the polished, though natural color, in addition to the protection afforded by said coating.

By the present process the shellac engages only the exposed limited area of the kernel, so that but a negligible amount of the shellac is introduced into the digestive system in eating the nuts. Were the whole surface of the kernel covered with shellac, much of the flavoring of the nut would be absorbed by the shellac while in solution on the kernel, and since the shellac is insoluble in the mouth, the flavour of the kernel would be seriously impaired. The preferred preliminary gum coating set forth, aside from serving as a foundation for the shellac, serves to protect the kernel from giving up flavor to the shellac.

It is also within the scope of the invention to apply the protective covering as above described, to a nut, processed according to the teachings of the prior Reissue Patent No. 15,902. When the nut is thus protected, the tendency for the white coat of salt to chip off during the handling incident to opening of the shell is reduced, and the introduction of excess salt from the shell into the mouth in biting on the shell is obviated.

It is noted that the present process avoids the need for subjecting the nut to roasting heat for more than 20 minutes, so that the evaporation of volatile oils from the kernel is minimized and the flavor is preserved. The adhesion of salt crystals to the exterior of the kernel is also effective in imparting to the nut a flavor of freshness, preferred by many persons over that of nuts, the kernels of which have been substantially soaked in a salt brine.

The crystalline salt introduced dry by tumbling through the cleft of the shell would, in the absence of the protective dry glazed coating heretofore described, be in large part shaken out of the nut under the vibration incurred in transportation.

It is customary in eating pistachio nuts to bite on the shell to facilitate spreading the cleft and separating the segments of the shell for access to the kernel. The glazed coating over the layer of color prevents staining the hands and lips according to the present invention, for the edible shellac is substantially insoluble in water and completely prevents contact between the dye and the fingers or lips, in the handling involved in holding and cracking the nut preparatory to eating.

While there has been described in the foregoing, a specific process of treatment of the nut involving a plurality of steps in a specific preferred order, it is, of course, understood that it is within the scope of the broader aspects of the invention, to vary the order of steps, as by applying the salt or other flavoring matter to the kernel prior to, rather than subsequent to applying the color coating.

It will thus be seen that there is herein described a process in which the several features of this invention are embodied, and which attains the various objects of the invention and is well suited to meet the requirements of practical use.

As many changes could be made in the above process, and many apparently widely different embodiments of this invention could be made without departing from the scope thereof, it is intended that all matter contained in the above description shall be interpreted as illustrative and not in a limiting sense.

Having thus described my invention, what I claim as new and desire to secure by Letters Patent is:—

1. The process of treating nuts of the type including a kernel in a hard cleft shell, which includes the steps of applying thereto, coloring in a liquid carrier, tumbling the colored nuts in dry crystalline salt to flavor the kernel while roasting the nut, and applying to the colored, roasted and salted nut, a spray of an alcoholic solution of edible shellac and evaporating the alcoholic solvent thereof.

2. The process of treating nuts of the character comprising a kernel in a cleft hard shell, which comprises applying thereto certified food color, in a liquid carrier, evaporating the carrier, tumbling the nuts in dry crystalline salt, while roasting the same, and then applying thereto a water resistant glazed transparent protective coating.

3. The process of treating nuts of the character comprising a kernel in a cleft hard shell, which comprises the step of preliminarily heating the nuts, spraying thereonto certified food color in a warm-water carrier, evaporating the carrier, tumbling the nuts in dry crystalline salt while roasting the same and after cooling of said nuts applying thereto a water-resistant glazed transparent protective coating.

4. The process of treating nuts of the type including a kernel in a hard cleft shell, which includes the steps of spraying thereonto, a color solution, tumbling the colored nuts in dry crystalline salt to flavor the kernel, while roasting the nut, applying to the colored, roasted and salted nut a spray of a gum solution, drying the nuts and finally applying an alcoholic solution of edible shellac and evaporating the solvent thereof.

5. The process of treating nuts of the character comprising a kernel in a cleft hard shell, which comprises the step of preliminarily heating the nuts, spraying thereonto certified food color in a warm water carrier, evaporating the carrier, tumbling the nuts in dry crystalline salt while roasting the same and after cooling of said nuts, applying thereto in a spray, an alcoholic solution of edible shellac and finally drying the nuts.

6. The process of treating nuts of the character comprising a kernel in a cleft hard shell, which comprises the step of preliminarily heating the nuts, spraying thereonto certified food color in a warm water carrier, evaporating the carrier, tumbling the nuts in dry crystalline salt while roasting the same and after cooling of said nuts, applying thereto a spray of gum arabic in solution, evaporating the solvent and then applying a spray of an alcoholic solution of edible shellac and finally drying the nut.

7. The process of treating nuts in which the kernel is exposed through a cleft hard shell, which process includes the steps of applying to the nut in a fine spray for about 10 minutes, certified food color, in concentration of about 3½ ounces to 8 gallons of water, then tumbling the nuts in dry crystalline salt during the application of roasting heat to the nut for about 20 minutes, and finally applying to the shell of the thus treated nut a protective transparent coating substantially insoluble in water.

8. The process of treating nuts in which the kernel is exposed through a cleft hard shell, which process includes the steps of applying to the nut in a fine spray for about 10 minutes, certified food color, in concentration of about 3½ ounces to 8 gallons of water, then tumbling the nuts in dry crystalline salt during the application of roasting heat to the nut for about 20 minutes, and then applying an outer transparent protective coating by spraying thereunto a solution of about one pound of edible shellac to one quart of alcohol solvent, and finally evaporating the solvent therefrom.

9. The process of treating nuts in which the kernel is exposed through a cleft hard shell, which process includes the steps of applying to the nut in a fine spray for about 10 minutes, certified food color, in concentration of about 3½ ounces to 8 gallons of water, then tumbling the nuts in dry crystalline salt during the application of roasting heat to the nut for about 20 minutes, then applying a spray of an aqueous solution of gum arabic of approximately two pounds to one gallon of water solvent, evaporating the solvent and finally applying an outer transparent protective coating substantially insoluble in water.

10. The process of treating nuts in which the kernel is exposed through a cleft hard shell, which process includes the steps of applying to the nut in a fine spray for about 10 minutes, certified food color, in concentration of about 3½ ounces to 8 gallons of water, then tumbling the nuts in dry crystalline salt during the application of roasting heat to the nut for about 20 minutes, then applying a spray of an aqueous solution of gum arabic, of approximately two pounds to one gallon of water solvent, evaporating the solvent, spraying onto the nuts a solution of approximately one pound of edible shellac to one quart of alcohol solvent, and finally evaporating the solvent.

11. The process of treating nuts in a hard cleft shell that exposes a restricted area of the kernel, of treating the nuts with a solid flavoring ingredient to introduce such flavoring into the shell for contact with the kernel, and completely coating the entire exposed surface of the shell and the restricted exposed surface of the kernel with a protective dry glazed coating substantially insoluble in water.

12. The process of treating nuts of the type comprising a kernel slightly exposed within a cleft hard enclosing shell, which process consists in treating the nuts with a solid flavoring salt to flavor the kernel and applying a coating of edible shellac to the entire exposed surface of shell and kernel, whereby the kernel will be protected from the entry of atmospheric moisture thereto and from the loss under vibration of salt therefrom.

13. The process of treating pistachio nuts, the kernels of which are slightly exposed through cleft hard shells, which process comprises applying a water soluble coating to the shells, which masks the natural color thereof, treating the nuts with substantially dry salt to flavor the kernel and protecting the masking coating and the kernel by the application of edible shellac solution to completely enclose the exposed face of the shell and the exposed area of the kernel.

14. The process of treating pistachio nuts in the cleft shell, which consists in applying a coating on the exposed surface of the shell to mask the natural color thereof, roasting the kernel, treating the nut with substantially dry salt, applying onto the nuts and drying thereon a gum solution and then applying a coating of edible shellac to waterproof the coating and prevent access of moisture to, or loss of salt or flavor from the enclosed kernel.

Signed at New York in the county of New York and State of New York this 3rd day of February, A. D. 1933.

JOSEPH A. ZALOOM.